March 8, 1932.  P. BÂCLE  1,848,865
TRANSPLANTING MACHINE
Filed Sept. 25, 1926  3 Sheets-Sheet 1

Inventor
Paul Bâcle
per [signature]
Attorney

March 8, 1932. P. BÂCLE 1,848,865
TRANSPLANTING MACHINE
Filed Sept. 25, 1926 3 Sheets-Sheet 2

Inventor
Paul Bâcle
per
Attorney

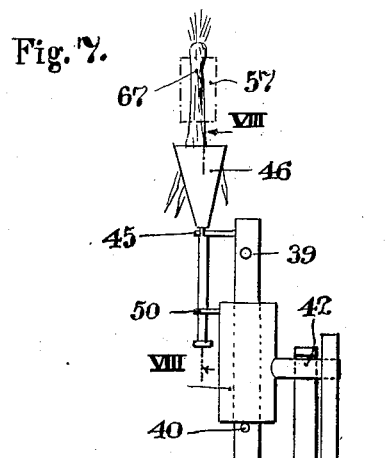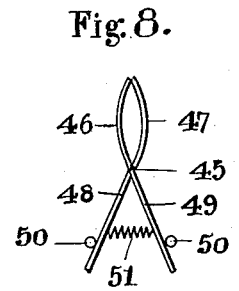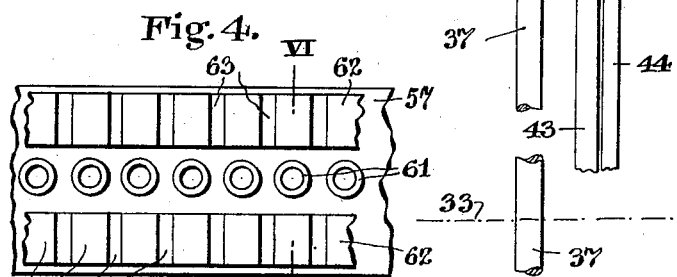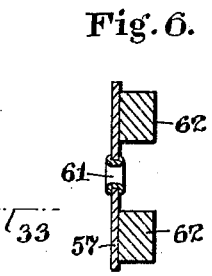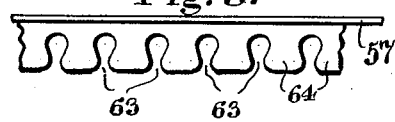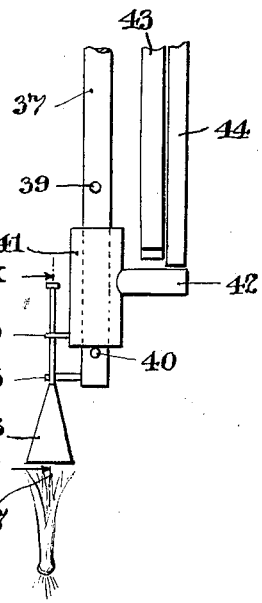

Patented Mar. 8, 1932

1,848,865

UNITED STATES PATENT OFFICE

PAUL BÂCLE, OF LA POMMERAIE, NEAR POUZAUGES, FRANCE

TRANSPLANTING MACHINE

Application filed September 25, 1926, Serial No. 137,779, and in France December 28, 1925.

The present invention relates to a planting machine and more particularly to a machine for transplanting vegetables, such as cabbages, beet roots, turnips and other vegetables.

The machine of the present invention effects mechanical transplanting of young vegetables which heretofore has been effected by hand. The transplanting can be effected by the machine according to the invention rapidly, with perfect regularity, with variable adjustment of the intervals between plants and with considerable decrease in the fatigue of the operator.

The machine accomplishes its objects and purposes by tracing or plowing a planting furrow, then widening this furrow, then transporting the vegetables previously placed on a band or strip with the roots up, then detaching the vegetables one by one, turning them over, causing them to fall in the furrow and finally filling the furrow with dirt and pressing the earth around the roots of the young plants.

Reference is made hereby to the accompanying drawings, wherein similar elements are designated by similar reference numerals and wherein:

Fig. 4 is an elevation to enlarged scale of the transporting band.

Fig. 5 is a plan view of Fig. 4.

Fig. 6 is a section of the distributing band on the line VI—VI of Fig. 4.

Fig. 7 is a detail of the distributing member to enlarged scale.

Figs. 8 and 9 are sections on the lines VIII—VIII and IX—IX of Fig. 7, respectively.

Figure 1:
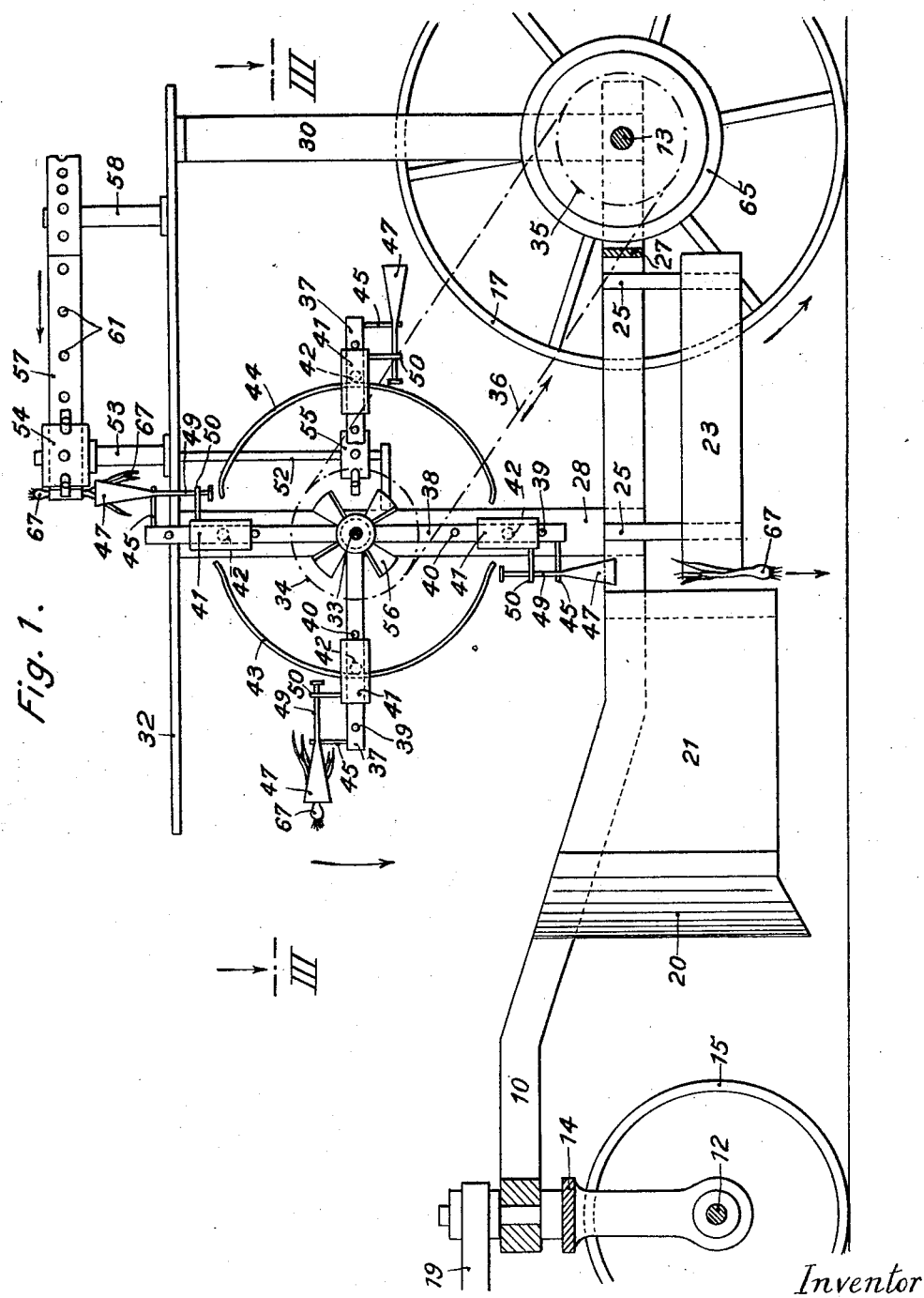
Fig. 1 illustrates a longitudinal vertical section of the machine according to the invention on the line I—I of Fig. 2.
Figure 2:
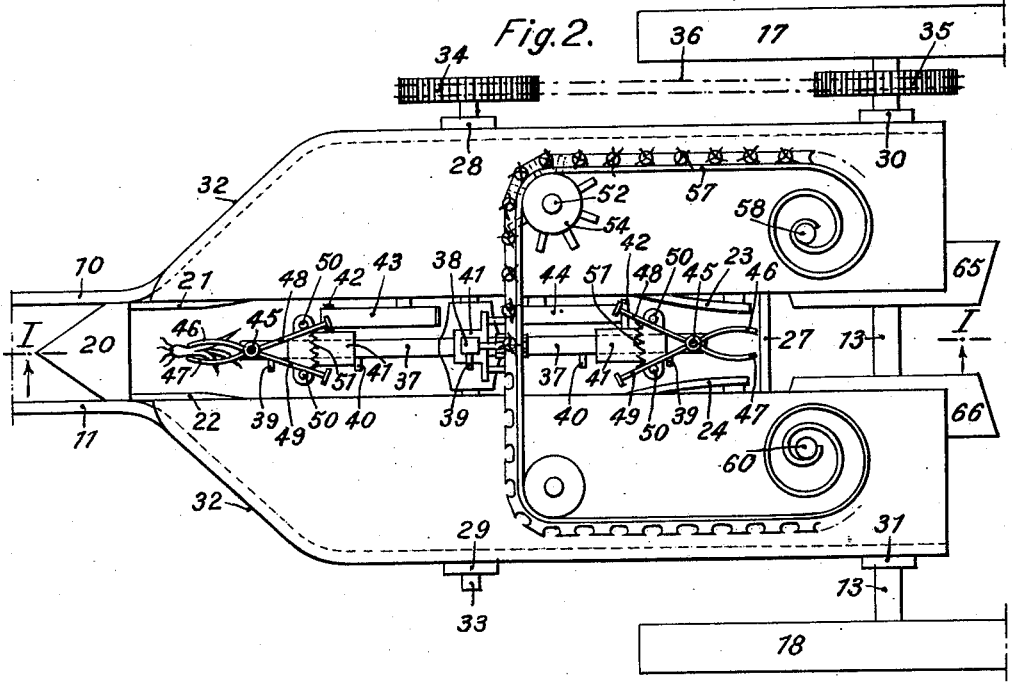
Fig. 2 is a plan view of the machine.
Figure 3:
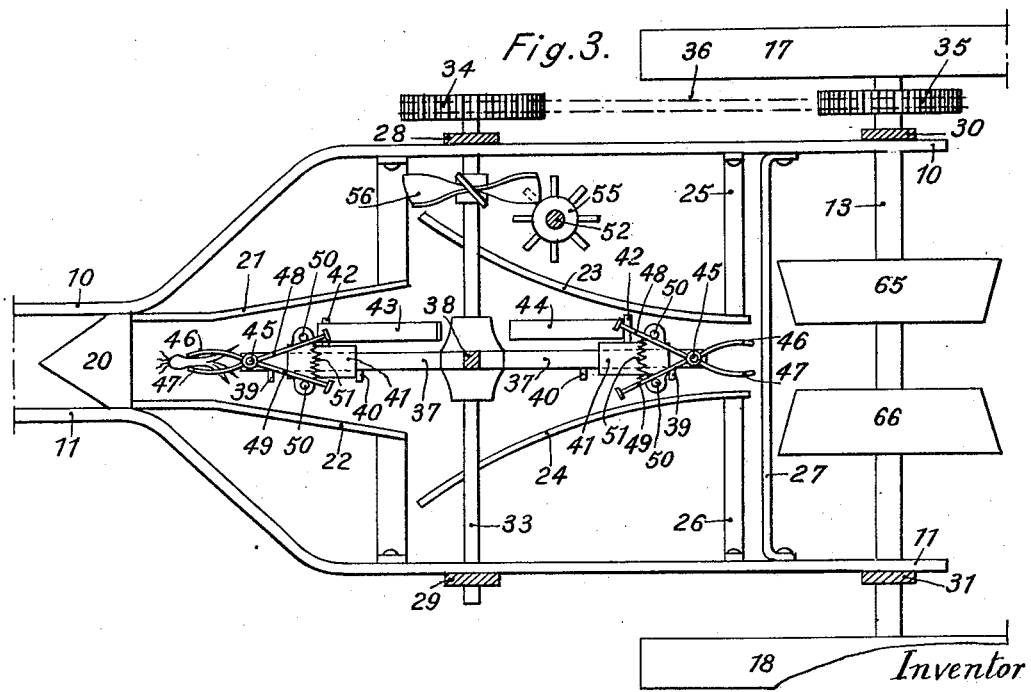
Fig. 3 is a horizontal section of the machine on the line III—III of Fig. 1 in the direction of the arrows.

As shown in the drawings the chassis of the machine comprises angular longitudinal members 10 and 11 which are fastened to the axles 12 and 13 at the front and rear of the machine, respectively. The front axle 12 is pivotally connected by means of a fork member 14 to said members 10 and 11. Front wheels 15 and 16 are mounted on front axle 12 and rear wheels 17 and 18 are mounted and fixed on rear axle 13. A draw bar 19 is pivotally connected to the pivot for the fork member 14. A spacing bar 27 is fastened between members 10 and 11 at the rear of the machine.

A solid coulter 20 and flaring members 21 and 22 are attached to the chassis so that the furrow is made and widened, respectively, by passage of the machine over the ground, the wheels being in adjacent furrows. A pair of converging guides 23 and 24 are spaced behind said flaring members 21 and 22 and are attached to the chassis of the machine by brackets 25 and 26.

Forward upright members 28 and 29 and rear upright members 30 and 31 are fastened to the chassis intermediately and at the rear thereof and support an apron 32 which is provided with a centrally located longitudinal space.

A horizontal transverse shaft 33 is rotatably mounted in forward upright members 28 and 29. A pinion gear 34 is fastened on the end of said shaft 33 beyond upright member 28 and a second pinion gear 35 is keyed to the rear axle 13. An endless chain 36 engages gears 34 and 35 so that movement of the machine and rotation of rear axle 13 causes rotation of shaft 33.

A distributing member is fastened to shaft 33 and rotates therewith. Said distributing member comprising arms 37 and 38, preferably in quadrature, which rotate in a vertical longitudinal plane and pass through the space provided in apron 32. Stops 39 and 40 are spaced near the ends of each arm (see Figure 7). Sleeve members 41 are mounted on the ends of each arm and are adapted to slide freely thereon between said stops 39 and 40. Perpendicular projections 42 are integral with each sleeve member and are adapted to engage circular guides 43 and 44 attached in diametrically opposite positions on said machine, the radius of said guide 43 being less than that of guide 44 and such that projections 42, when adjacent and abutting stops 40 slidably engage the inner surface of guide 43 (see upper half of Figure 7). The radius of guide 44 is such that the projections 42, when adjacent and abutting stops 39, slidably engage the outer surface of guide 44 (see lower half of Figure 7).

The ends of circular guides 43 and 44 are in horizontal as well as vertical spaced relation so that when arm 37 or 38 is in vertical position sleeve members 41 are free to fall due to gravity. In intermediate positions of the arms, sleeve members 41 are held against stops 39 if projections 42 slidably engage guide member 44 or are held against stops 40 if projections 42 slidably engage guide 43.

Rods 45 are perpendicularly positioned near the ends of arms 37 and 38 and form a pivot for tongs carrying plants 67 and comprising jaws 46 and 47 and arms 48 and 49. Fork members 50 are positioned on sleeve members 41 and engage said arms 48 and 49 to close jaws 46 and 47 when said sleeve members 41 abut stops 40. Springs 51 are placed between arms 48 and 49 to hold jaws 46 and 47 normally open, but said spring is of such strength that it is overcome by the weight of said sleeve members 41 and jaws 46 and 47 can be closed thereby.

A vertical shaft 52 is rotatably mounted with respect to apron 32 by means of a bearing 53. A sprocket wheel 54 is mounted on the upper end of shaft 52 while a second sprocket wheel 55 is positioned on the lower end of said shaft 52 and is in the same horizontal plane as shaft 33. A star wheel composed of curved vanes 56 is mounted on shaft 33 in quadrature. Said vanes 56 engage said sprocket wheel 55 to rotate shaft 52 intermittently.

A transporting band 57 is coiled about a pivot 58, passes around sprocket wheel 54, an idle pulley 59 and is wound up on a pivot 60. Said pivot 60 may be actuated in any known manner (not shown) to keep the band 57 taut and to cause winding thereof on pivot 60.

Transporting band 57 is made of a suitable nonstretching flexible material, such as fabric, and is provided with a plurality of central perforations, equally spaced and reenforced by metal eyelets 61. These eyelets 61 receive the teeth of intermittently rotating sprocket 54 so that the band 57 is intermittently moved. Strips 62 of resilient material, such as rubber, are placed along each edge of the band 57. Vertical undercut recesses 63 are provided at regular intervals in said strips 62 to form projections 64 which are centered above and below eyelets 61. Recesses 63 are provided in such form and size so that the plants to be transported are resiliently held between projections 64.

Tamping members 65 and 66 in the form of truncated cones are mounted in spaced relation on rear axle 13. These tamping members 65 and 66 are of such diameter that the dirt piled up about the plants by the converging guides 23 and 24 is pressed firmly against the roots of the plants.

The operation of the transplanting machine is as follows:

The machine is drawn or driven along in any known manner whereupon horizontal shaft 33 is continuously rotated and vertical shaft 52 and transporting band are intermittently actuated. Coulter 20 makes the original furrow which is widened by flaring members 21 and 22 so that it is of proper depth and width to receive the plants. The plants are resiliently held in inverted position and transported on the band 57. Jaws 46 and 47 are open when the ends of arms 37 and 38 are in the lowermost position and are maintained thus by the sliding engagement of projections 42 on the outer surface of guide 44. As the jaws 46 and 47 approach the uppermost position the vanes 56 of the star wheel move transporting band 57 so that the head of the plant 67 is brought between the open jaws 46 and 47. When projections 42 leave guide 44, the weight of sleeve members 41 causes them to fall. Fork members 50 engage arms 48 and 49, overcome springs 51 and close jaws 46 and 47 so that the plant is removed from the band 57 by further movement of the arms.

The jaws 46 and 47 are now held in closed position since guide 43 holds sleeve members 41 in retracted position. As the arms 37 and 38 approach the lowermost position, projections 42 disengage from guide 43, sleeve members 41 fall, jaws 46 and 47 are opened by springs 51 and the plant falls into the furrow.

Converging guide members 23 and 24 pile dirt around the roots of the plants and tamping members 65 and 66 press the dirt down to make it firm.

Since many different modifications of the present invention are possible, this disclosure is to be construed in an illustrative and not in a limiting sense.

Having now particularly described my invention, what I desire to protect by Letters Patent of the United States and what I claim is:—

1. A transplanting machine, including a transporting member for transporting plants in inverted position comprising a band provided with resilient strips mounted along the edges thereof having recesses to hold said plants, there being spaced perforations in said transporting member, a distributing member removing the plants from the transporting member, then rotating the plants until the roots thereof are downward and finally releasing said plants, and actuating means engaging the perforations and intermittently moving said band.

2. A transplanting machine comprising, a transporting member for the plants in inverted position, a distributing member removing said plants from the transporting member, rotating said plants until the roots are downward and then releasing the plants, a horizontal shaft continuously rotating and supporting said distributing member, a star wheel mounted on said shaft, a sprocket wheel intermittently engaging said star wheel and a second sprocket wheel rigidly connected to said first sprocket wheel and engaging said transporting member to intermittently move the same.

3. A transplanting machine comprising, a transporting member for the plants in inverted position, a distributing member comprising arms in quadrature and plant holding means on each arm normally open during 180° rotation of said arms and closed during the remaining 180° rotation of said arms, the changes in position of said holding means being caused by gravity and occurring substantially at the top and bottom of the circular path thereof and actuating means intermittently moving said transporting member.

4. A transplanting machine comprising, a transporting member for the plants in inverted position, a distributing member comprising arms in quadrature and plant holding means on each arm normally open during 180° rotation of said arms and closed during the remaining 180° rotation of said arms, the changes in position of said holding means being caused by gravity and occurring substantially at the top and bottom of the circular path thereof, a horizontal shaft supporting said arms and continuously rotating the same, curved vanes in quadrature on said shaft angularly displaced 45° with respect to said arms and a sprocket wheel intermittently actuated by said vanes and engaging said transporting member to move the head of a plant into position to be grasped by said holding means in uppermost position.

The foregoing specification of my "Machine for planting cabbages, beet-roots, turnips, etc.," signed by me this 13th day of September, 1926.

PAUL BÂCLE.